Figure 1:
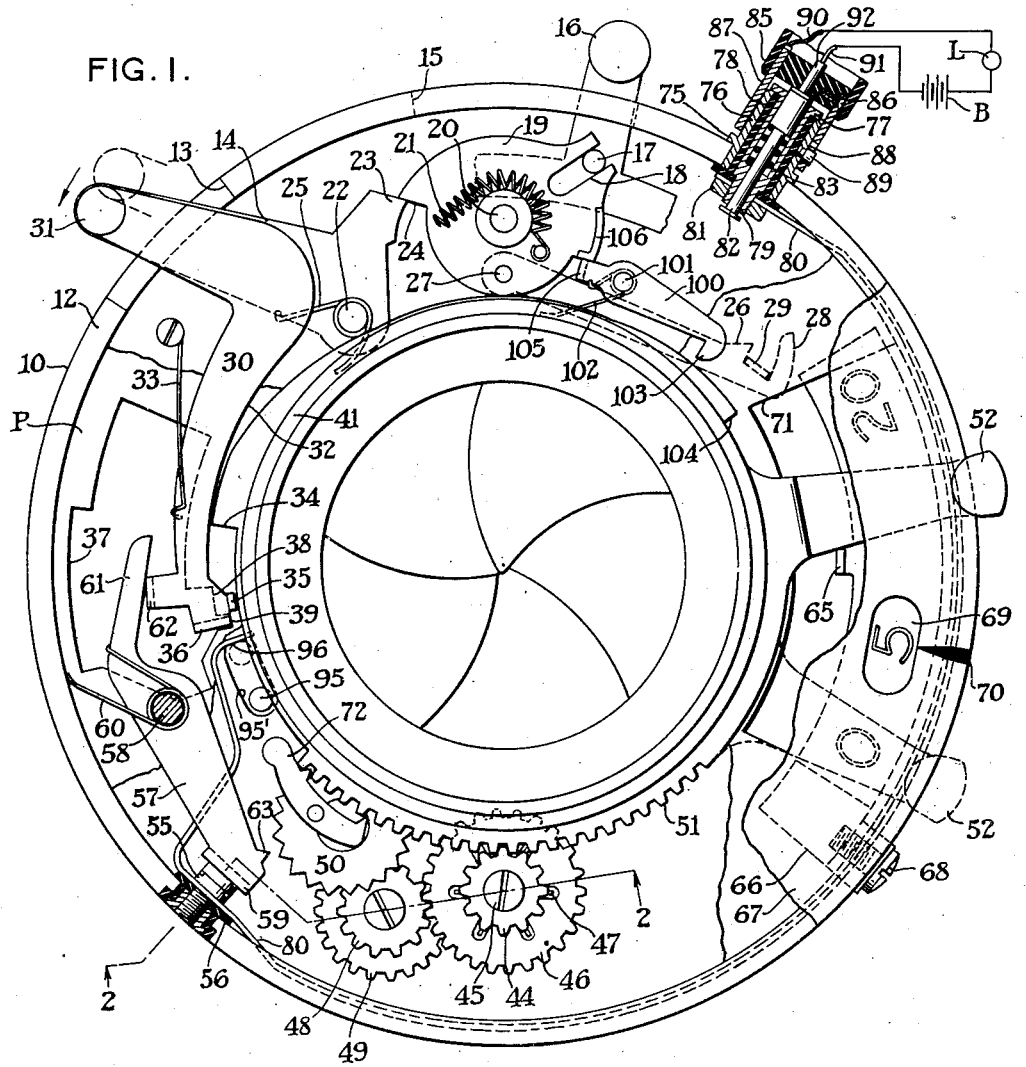

Aug. 13, 1946. C. C. FUERST 2,405,741
FLASH LAMP SYNCHRONIZING APPARATUS
Filed June 13, 1944 2 Sheets-Sheet 1

CARL C. FUERST
INVENTOR
BY
ATTORNEYS

Aug. 13, 1946.                C. C. FUERST                    2,405,741
                    FLASH LAMP SYNCHRONIZING APPARATUS
                    Filed June 13, 1944          2 Sheets-Sheet 2

CARL C. FUERST
*INVENTOR*

BY
*ATTORNEYS*

Patented Aug. 13, 1946

2,405,741

UNITED STATES PATENT OFFICE 2,405,741

FLASH LAMP SYNCHRONIZING APPARATUS

Carl C. Fuerst, Rochester, N. Y., assignor to Eastman Kodak Company, Rochester, N. Y., a corporation of New Jersey Application June 13, 1944, Serial No. 540,048

9 Claims. (Cl. 67—29)

The present invention relates to photography, and particularly to a photoflash synchronizing device suitable for synchronizing the flashing of a lamp and the opening of a camera shutter when instantaneous exposures at high shutter speeds are desired.

More specifically, the present invention relates to a flash synchronizing device which is built into and constitutes a part of a between-the-lens type of camera shutter, the arrangement being such that certain of the shutter parts constitute a part of the synchronizing apparatus.

As is generally well known by those skilled in the art, flash lamps which are used in photography generally include a characteristic "lag," as the time to reach the peak of illumination after the circuit to the filament thereof is closed is commonly known as, which must be taken into account in order to synchronize the flashing of the lamp with the opening of the shutter. In flash synchronizing apparatus the lamp "lag" is generally accounted for by closing the lamp circuit a given time prior to the actual release of the camera shutter so that the shutter when fully opened will include the peak of illumination of the lamp. It has been found that the most satisfactory and efficient manner of accurately controlling the time relation of these two operations is to have the lamp circuit controlled through movement of the mechanism of the shutter itself.

As the result of much research work on flash lamps recently there are now available lamps the "lags" of which vary all the way from approximately 4 milliseconds to 20 milliseconds. The more common of the commercially available flash lamps for use with between-the-lens type of shutters have a 5-millisecond "lag" or a 20-millisecond "lag." It will be obvious that a flash synchronizer suitable for use with lamps having "lags" over this range, or for use with lamps at the extreme ends of this range, must be provided with some suitable means for readily adjusting the same to account for different time delays between the closing of the lamp switch and the release of the shutter.

Added to the many types of flash lamps that are used in photography is a gaseous discharge lamp well known to those skilled in the art as the Edgerton lamp and available on the market under the trade name, Kodatron lamp. This flash lamp, in addition to giving a very bright illumination of exceedingly short duration, has no noticeable "lag," but for synchronizing purposes is considered to flash the instant the circuit thereto is closed. The synchronizing problem with a lamp of this type is just the reverse of that in ordinary flash lamps, because the delay between the instant the shutter is tripped and the blades are fully opened, which can be referred to as the "lag" of the shutter, has to be accounted for rather than the lamp "lag." A synchronizing device in order to be universal must be such as to be capable of use with all types of flash lamps whether they have a "lag" or not.

Therefore, one object of the present invention is the provision of a flash synchronizing apparatus which is adapted for use with flash lamps having a "lag" and/or flash lamps having no "lag."

Another object is to provide a flash synchronizing apparatus which is built into a between-the-lens type of camera shutter and is, in fact, a part of the shutter operating mechanism.

Another object is the provision of a flash synchronizing device which forms a part of a shutter which is tripped by a delayed action power-driven actuating means in a given time after the release of said actuating means, and in which the delay between the tripping of said actuating means and the tripping of the shutter thereby is utilized to account for the "lag" in a given flash lamp being used.

And a further object is the provision of a flash synchronizing device of the type set forth in which the delayed action of the shutter actuating means can be readily altered by means of a scale marked in flash lamp "lags" in order to adjust the device for use with different flash lamps.

And another object is to provide a flash synchronizing device of the type set forth in which the flash lamp circuit includes a switch controlled by a pivoted arm, the switch arm being so arranged that it normally locks the drive for the shutter actuating mechanism and is moved into switch-closing position at the instant that the drive for shutter actuating mechanism is released from a set position.

And yet another object is to provide a flash synchronizing device of the type set forth which includes, for use with flash lamps having no "lag," a second switch in the lamp circuit in parallel with said first-mentioned switch, and which second switch is adapted to be closed, at the instant the shutter blades are in their full open position. When this second switch is used the actuating means for the shutter is rendered inoperative and the shutter is tripped instantaneously by manual operation of the shutter trigger.

And a further object is the provision of a flash synchronizing device of the type set forth which is built into a between-the-lens type of shutter so as to constitute a part thereof, and so that the parts of the shutter mechanism constitute parts of the flash synchronizing device, the whole being contained within the shutter casing.

Figure 3:
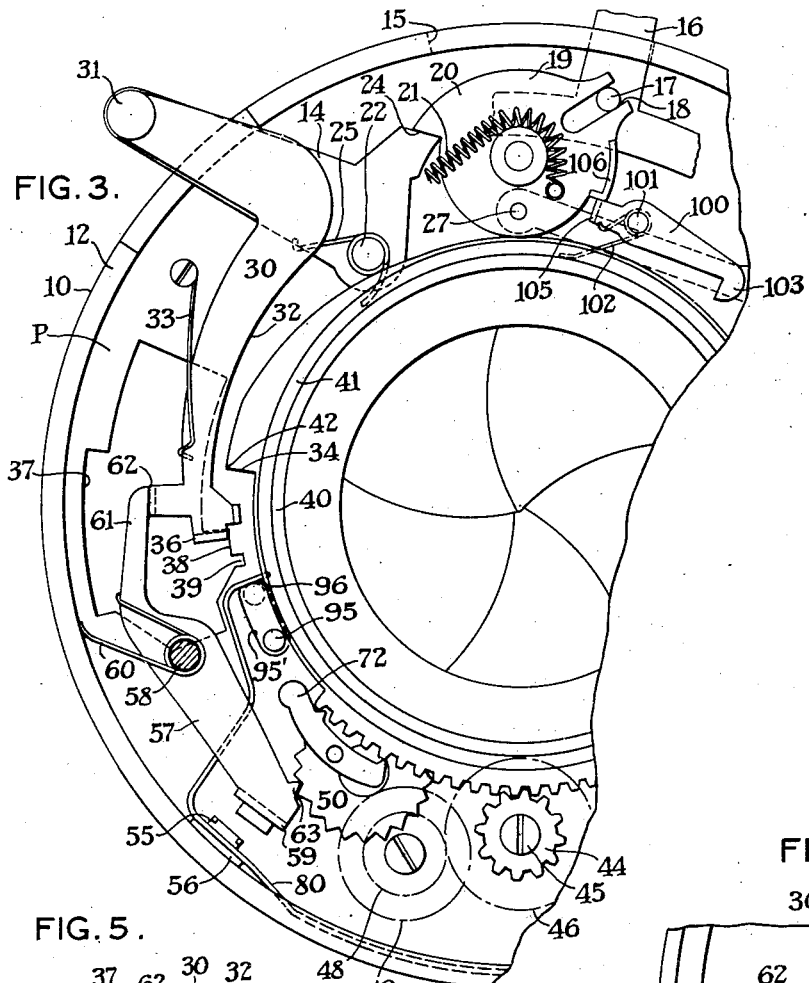
Figure 5:
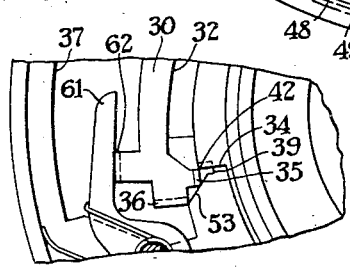
Figure 4:
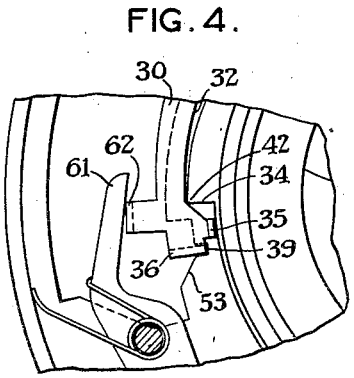
Figure 6:
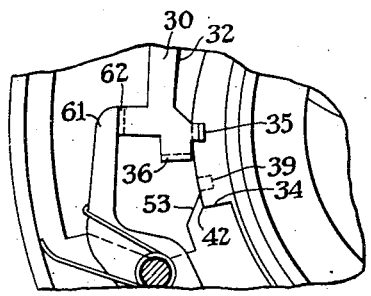

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a plan view of a shutter constructed in accordance with and embodying a preferred form of my present invention, and showing the parts in the position they assume just after the shutter actuating means has been released and the flash lamp switch has been closed, but before the shutter master member has been released, Fig. 2 is a section taken substantially on line 2—2 of Fig. 1, Fig. 3 is a partial plan view of the shutter shown in Fig. 1 but with the parts shown in the position they assume when the shutter is set and is ready for operation, Fig. 4 is a partial plan view of the shutter mechanism, and showing the end of the trigger lever in latched engagement with a notch in the cover plate in the shutter casing, and the actuating member just about to release the trigger lever from latched engagement, Fig. 5 is a fragmentary detail corresponding to Fig. 4 but showing the trigger lever after it has been disengaged from the notch in the cover plate of the shutter casing and has been moved toward a shutter tripping position by the actuating member, and Fig. 6 is a fragmentary detail, corresponding to Figs. 4 and 5, and showing the position of the trigger lever after it has been moved to shutter tripping position and has returned to its normal position, and showing the shutter actuating member covering the notch in the cover plate of the shutter casing to prevent engagement between the latch on the end of the trigger lever and the notch.

Like reference characters refer to corresponding parts throughout the drawings.

It is well known in the art that the easiest and most satisfactory manner of securing accurate shutter and flash synchronization is to incorporate the switch contacts of the lamp circuit into the shutter operating mechanism so that the movement of the shutter mechanism itself will effect the closure of the lamp circuit in proper timed relation with the opening of the camera shutter. The present synchronizing device makes use of such an arrangement inasmuch as the lamp switch is built into a so-called delayed action shutter, or a shutter of the type which was primarily designed to permit a person to release the shutter and still have time to move around in front of the camera and take his own picture. In a delayed action shutter the shutter mechanism is adapted to be actually tripped by an actuating member which is rotated by a power mechanism driving through a gear retard. After the shutter has been set, a manual actuation of the trigger releases the actuating member and its driving mechanism but does not release the shutter master member. Then, after a given delay, the actuating member trips the shutter master member. According to the present invention, a first switch is built into the shutter so as to be closed the instant the actuating member is released so that the delayed action thereof in tripping the shutter is utilized to synchronize the flashing of the lamp with the opening of the shutter. In one condition of the shutter mechanism the actuating member for the shutter is not used to trip the shutter, but the shutter is tripped instantaneously by manual operation of the trigger. This condition of the shutter mechanism is utilized to synchronize flash lamps having no "lag," and a second switch, in parallel with the first in the lamp circuit, is arranged to be closed the instant the shutter reaches its full open position. Under this condition, the first switch is automatically rendered inoperative.

Figure 2:
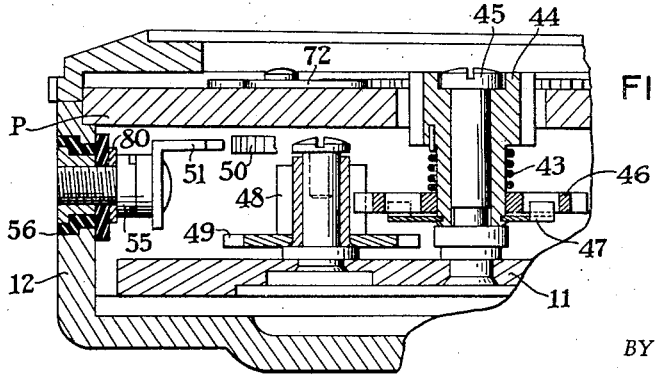

Referring now to Fig. 1 of the drawings, the present invention comprises a shutter of the setting type which may comprise a casing 10 having an upstanding peripheral flange 12 and in which casing there is mounted a mechanism plate 11, see Fig. 2, on which most of the moving parts of the shutter mechanism is mounted. The flange 12 is provided with a cut-out notch 13 through which a trigger 14 may operate, and another elongated notch 15 through which the setting member 16 may extend. Fixed to the setting member 16 is a pin 17 which is adapted to move through the slot 18 in the master member 19 to turn it about pivot 20 and to tension on operating spring 21 when the setting member is moved clockwise to its set position shown in Figs. 1 and 3.

The trigger 14 is pivoted upon a stud 22 and is provided with a latch member 23 which is adapted to engage and hold the master member 19 in a set position. When in such position, the member 23 engages the latching surface 24 on the master member. By depressing the trigger 14, which is held in its uppermost position by spring 25, surface 24 may be released, permitting the master member, through the crank 26 pivoted at 27, to swing the hook 28, engaging the blade ring lug 29, rapidly back and forth to make an exposure. As thus far described, the mechanism is known in the prior art, it being disclosed in U. S. Patent 2,099,866, issued November 23, 1937, to W. A. Riddell.

To the trigger 14 there is attached a trigger lever 30, this lever being pivoted upon a stud 31 carried by the trigger and being provided with a cam surface 32. A spring 33 tends to press the lever 30 toward a hook 34. On the end of the trigger lever there is provided an upstanding lug 35 and a downwardly extending lug 36. The downwardly extending lug extends through an irregular opening 37 in an annular cover plate P and cooperates with the edge thereof to determine the position of the upstanding lug 35 with respect to the path of movement of the hook 34. This cover plate normally covers the majority of the shutter mechanism and only certain openings therein, one of which is 37, is of importance to the present invention. Accordingly, in order to clearly show the shutter structure which is necessary to an understanding of the present invention, the cover plate P has been broken away to reveal the shutter mechanism in full lines and to show only the parts of the plate which are made use of in carrying out the present invention.

When the shutter is in a set condition, see

Fig. 3, the spring 25 moves the trigger mechanism in a clockwise direction until the part 23 fully engages the latching surface 24 on the master member 19 and the downwardly turned lug 36 on the end of the trigger lever 30 engages a step 38 in the edge of the opening 37 in the cover plate P. To release the shutter, the trigger mechanism is manually depressed in a counter-clockwise direction until the downwardly turned lug 36 on the end of the trigger lever snaps into a notch 39 formed in the edge of the opening 37 in the cover plate, and in which position the trigger mechanism is positively locked against further manual actuation. The parts of the mechanism will then assume the positions shown in Fig. 1 and it will be noticed that the latch member 23 has not disengaged the master member 19 although it has moved part way to a shutter tripping position.

In order to trip the shutter it is necessary to disengage the trigger lever from latched engagement with the notch 39 in the plate P and move the lever 30 further in a counter-clockwise direction and thus disengage the latch member 23 from engagement with the latching surface 24 of the master member. This cannot be accomplished manually, because there is no way of disengaging the lug 36 on the lever 30 from the notch 39. It is, therefore, done by a delayed action mechanism including an actuating ring on which the hook 34 is mounted, and which mechanism will now be described.

Rotatably mounted on the cover plate P in encircling relation with a flange 40 is an actuating ring 41 which includes the hook 34 extending radially therefrom and terminating in a corner 42. This actuating ring is adapted to be driven in a counter-clockwise direction, from a fully set position shown in Fig. 3, through a gear retard mechanism comprising a series of gears connected to a power spring 43. As clearly shown in Figs. 1 and 2, this gear retard comprises a pinion 44 rotatably mounted on a stub shaft 45 and encircled by the spring 43 one end of which is pinned to the pinion. The pinion 44 is adapted to be connected to a gear 46 through a one-way clutch mechanism of the ratchet type, generally indicated at 47, to include the remainder of the train consisting of pinion 48, gear 49 and star wheel 50, the latter being driven by gear 49 through a pinion, not shown, fixed on the shaft carrying the star wheel.

The pinion 44 is in turn geared to the actuating ring 41 through a gear sector 51 carried on the periphery of said ring. When the actuating ring is moved in a clock-wise direction by the handle 52 to a set position, see Fig. 3, the spring 43 is wound up in preparation for driving the actuating member in a counter-clockwise direction when the gear train is released. The one way clutch mechanism 47 between the pinion 44 and gear 46 is provided so that the complete gear train need not be operated during the setting operation of the actuating member and to thereby relieve all unnecessary resistance to such setting operation.

When the shutter mechanism is in a set condition and the actuating ring has also been set, see Fig. 3, and after the trigger mechanism has been manually pressed to move the lug 36 on the end of the trigger lever 30 into latched engagement with the notch 39 in the shutter cover, then the actuating ring is released, in a manner to be hereinafter described. As soon as the actuating ring is released, and starts to move in a counter-clockwise direction under the action of the power spring 43 acting through the gear retard, the corner 42 on the actuating ring first engages the cam surface 32 of the trigger lever 30 and cams the lug 36 out of the notch 39, see Fig. 4. This releases the trigger mechanism, and during further movement of the actuating ring the hook 34 positively engages the upstanding lug 35 on the end of the trigger lever and pulls the lever and the trigger 14 in a counter-clockwise direction to move the latch 23 from engagement with the latching surface 24 of the master member 19 and thereby trip the shutter. During this stage of the movement of the actuating ring, the downturned lug 36 rides along an inclined portion 53 in the edge of the opening 37, and this incline causes the trigger lever to be pivoted in a clockwise direction about the stud 31, see Fig. 5. By the time that the hook on the actuating ring has moved the trigger lever far enough to trip the master member and release the shutter, the end of the trigger lever has been moved in a clockwise direction a sufficient amount to pass over the top of the hook 42 and snap back to its normal position under the action of spring 25. During this return movement of the trigger lever the lug 36 rides along the cam surface of the actuating ring adjoining the hook 34 which covers the notch 39.

When the actuating ring 41 is in this position, see Fig. 6, and the shutter is set, the parts are automatically positioned for normal exposure, that is to say, a pressure upon the trigger 14 would cause the trigger 14 and the trigger lever 30 to move through a normal path of movement, under manual control during which movement the lug 36 would move downwardly to substantially the end of the opening 37 without dropping into the notch 39. This is true because, when the trigger is moved from its set position, shown in Fig. 3, to its fully released position, shown in Fig. 5, with the actuating ring 41 in its normal position, shown in Fig. 6, the notch 39 is completely covered by the hook portion 34 on the actuating ring and the lug 36 of the trigger lever engages the cam surface adjoining the hook member on the actuating ring and moves through its complete travel without snapping into engagement with the notch 39. Accordingly, an instantaneous exposure, without benefit of the delayed action mechanism, can be effected by manual operation of the trigger when desired and this feature is made use of in the synchronizing device in order to adapt the apparatus for use with flash lamps having no "lag," as will now be fully set forth.

Coming now to the mechanism which is built into the shutter in order to synchronize the flashing of the lamp with the opening of the camera shutter, the shutter includes a built-in switch which is adapted to control the flash lamp circuit and which is adapted to be associated with the shutter mechanism so as to be operated in timed relation with certain parts thereof. As shown, in Figs. 1 and 3, this switch comprises a stationary contact 55 which is fixed to the flange 12 of the shutter casing and extends radially thereof into the shutter and is insulated from the shutter case by an insulating bushing 56. The other switch contact comprises a double-ended lever 57, pivoted intermediate its ends at 58, and including a contact portion 59 which is normally spring pressed into engagement with the stationary contact 55 through the action of a spring 60.

The other end 61 of the lever 57 is arranged to be abutted by a turned-down end of a lug 62 extending substantially radially from the trigger lever 30 when the trigger is in its normal position, see Fig. 3, and in which position the lever 57 is pivoted counter-clockwise against the action of the spring 60 to move the end 59 thereof away from the stationary contact 55 to open the switch. The contact end of the lever 57 is provided with a tooth 63 which, when the lever 57 is moved to a switch opening position, engages a notch in the star wheel 50 and locks the driving mechanism for the actuating spring against operation, see Fig. 3.

Thus, when actuating ring 41 is set and the trigger lever 30 is moved from its set position, shown in Fig. 3, to the position shown in Fig. 1 wherein the lug 36 thereon drops into the notch 39, the lug 62 on the trigger lever moves inwardly of the shutter enough to permit the switch lever 57 to pivot clockwise and immediately close the switch. At the same time, the gear retard mechanism is released by the tooth 63 on the contact end of the lever 57 and the spring 43 immediately starts to drive the actuating member from a set position, see Figs. 1 and 3, through the stages shown in Figs. 4, 5, and 6 until the shutter is actually tripped by the actuating member.

The delay between the time that the lamp switch is allowed to close and the time that the actuating member is driven around far enough to release the shutter is made use of to account for the "lag" in the flash lamp being used and to thereby synchronize the flashing of the lamp with the opening of the shutter. This period of delay can be modified over a suitable range by setting the actuating ring 41 to different positions by means of the setting arm 52, the different set positions of the ring necessarily moving the hook member 34 thereof to different distances from the notch 39 which latches the trigger lever. At the same time different amounts of gear retard action are introduced into the drive for the actuating ring since the farther the ring is moved clockwise the longer the actuating ring is geared to the retard mechanism before it moves to a shutter tripping position.

In Fig. 1, the actuating ring is shown set to a position necessary to introduce five milliseconds of "lag" between the time that the switch is closed and the shutter is tripped by the actuating ring. This position of the actuating ring is positively determined by a stop 65 on an arcuate segment 66 slidably mounted beneath the cover 67 of the shutter, see Fig. 1. This segment 66 is marked off in millisecond speeds in accordance with the lags of different flash lamps which might be used and is adjustably held in a given position of adjustment by a set screw 68 which is accessible from the outside of the shutter. In Fig. 1, the segment bearing the time delay indices is shown with the numeral 5 moved into alignment with a window 69 in the cover 67 of the shutter and into cooperation with an index 70 on the shutter cover. When the segment 66 is in this position the setting arm 52 can be moved in a clockwise direction only so far as is necessary to bring it into contact with the stop 65 on the segment, and in this manner the actuating member is properly set without the operator having to watch a scale moving over an index scale cooperating with it. If it is desired to set the apparatus to synchronize a flash lamp having a 20-millisecond "lag," then the segment 66 is set to a position in which the numeral 20, shown thereon in dotted lines, is moved under the window 69, and then the stop 65 on the segment 66 will be moved clockwise to a position in which it will positively stop the setting arm 52 when it reaches the dotted line position shown in Fig. 1.

After the actuating member has been released, and has moved to its normal position, shown in Fig. 6, the setting arm 52 will lie against the edge 71 of an opening in the annular cover plate P into which a turned down portion of the setting arm extends. In order to introduce sufficient retard action into the gear train it was found necessary to pivotally mount a pallet 72 on the cover plate P in such position as to engage the gear teeth 51 on the periphery of the actuating ring 41. As shown in Fig. 3, when the actuating ring is set in accordance with a flash lamp having a 5 millisecond "lag" the actuating ring takes up a position in which only about five teeth thereon is engaged by the first nose on the pallet. When the ring is set in accordance with a flash lamp having a "lag" of 20 milliseconds, the ring will take up a position, not shown, in which several more teeth on the gear segment will be engaged by the pallet.

To facilitate the connection of the lamp switch into a flash lamp circuit a terminal 75 is provided on the shutter and this terminal is designed to receive a socket of the bayonet lock type. As shown in Fig. 1, this terminal 75 comprises a shell 76 pressed into an opening in the flange 12 of the shutter casing so as to be grounded to said casing. This shell is, therefore, electrically connected to the switch lever 57 since said lever is also grounded to the shutter casing. Located within the shell 76 is a sleeve 77 which is insulated from the shell 76 and shutter casing 10 by an insulating bushing 78, and which terminates in a threaded end 79 extending into the shutter. This sleeve is electrically connected to the stationary contact 55 of the switch by a flat insulated wire 80, one end of the wire being fastened to the threaded end 79 of the sleeve by a nut 81 and following the flange 12 of the shutter casing around to the stationary switch contact. Slidably mounted in the sleeve 77 of the terminal is a plunger 82 which is normally spring pressed upwardly by a compression spring 83 lying between the underside of a head thereon and a shoulder in the base of the sleeve. This plunger constitutes the second contact of the terminal and is connected to the stationary switch contact 55 thru the sleeve 77 and conductor 80.

The flash lamp circuit including a source of potential B and a flash lamp L is provided with a bayonet type connector 85 which is adapted to engage with the terminal 75 for connecting the lamp switch in the shutter into the lamp circuit. This connector includes an insulating portion 86, i. e., plastic, etc., to which a metal sleeve 87 is connected in a suitable manner as by a set screw as illustrated. This metal sleeve 87 is provided with a conventional type of bayonet slot 88 which is adopted to engage a bayonet pin 89 extending radially from the periphery of the sleeve 76. One lead 90 of the lamp circuit is soldered to the metal sleeve 87 so that it is electrically connected to the shell 76 of the terminal when the connector is placed thereon. The other lead 91 of the lamp circuit is connected to a center contact 92 which is adapted to be engaged by the end of the spring pressed plunger 82 of the terminal. The spring 83 serves to hold the bayonet connection firm while at the same time insuring good contact between the plunger 82 and the center contact 92.

In order to accommodate flash lamps having no "lag" whatsoever, a second switch is provided in the shutter which is in effect connected into the flash lamp circuit in parallel with the first mentioned switch. This switch must be so arranged that it is closed the instant that the shutter is in its fall open position, rather than prior to or at the time the shutter is tripped, because the "lag" of the shutter mechanism must be accounted for.

To this end, the switch for flash lamps having no "lag" includes a pin 95 connected to the blade ring of the shutter and extending upwardly thru an arcuate slot 95' in the mechanism plate 11. Since in known shutter structures the blade ring oscillates over a given path during the opening and closing movements of the shutter the pin 95 will oscillate between the full line position and the dotted line positions shown in Figs. 1 and 3, reaching the dotted line position the instant the shutter is full open. Now if the pin 95 be metal it will be grounded to the led 90 of the flash lamp circuit and all that is necessary to provide a desired switch is to arrange a contact connected to the other side of the lamp circuit which is to be contacted by the pin 95 the instant the shutter is full open. As shown, this is done by extending the conductor 80 from the stationary switch contact 55 down into the path of the pin 95 and removing the insulation from the end 96 thereof. If the conductor 80 is not sufficiently rigid and resilient to constitute a practical switch contact, a separate phosphor bronze spring could be attached to the stationary contact 55 to act as this contact.

When a flash lamp having no "lag" is to be synchronized, the actuating ring 41 is left in its normal position in which the setting arm 52 thereof will abut the edge 71 of the opening in the coverplate P and the hook 34 thereon and the cam portion associated therewith, will cover the notch 39 as shown in Fig. 6. Under this condition the segment 66 will be moved counter-clockwise until the 0 thereon appears in the window 67 and the stop lug 65 on the segment will prevent the actuating ring from being set. Now when the shutter is operated, the lug 36 on the end of the trigger lever 30 will engage the cam portion of the hook member 34 and will slide over the notch 39 to the end of its stroke and then return to its normal position so that an instantaneous exposure will be made under full manual control of the trigger. Inasmuch as the end of the lever 30 cannot drop into the notch 39 the contact arm 57 is prevented from pivoting clockwise to close the first switch and the lamp circuit is closed when the pin 95 strikes the contact 96 at the instant the shutter is full open.

In order to hold the shutter parts in position to make normal exposures, as would be the case when the shutter was being used for ordinary daylight photography or with flash lamps having no "lag," there is provided a latch 100 pivotally mounted at 101 upon the cover plate P and being pressed by a spring 102 so that the hook 103 will be pressed into engagement with an abutment 104 on the periphery of the actuating ring 41. On the opposite end of the latch 100, there is a downwardly turned flange 105 which lies in the path of a lug 106 on the master member 19. Whenever the parts are in a position of rest, or unset, the ring 41 is latched. Consequently, if an operator should push down on the lever 52 in an effort to set the shutter actuating mechanism, the ring 41 could not be moved. However, the operator needs only to move the seting lever 16 to a set position shown in Figs. 1 and 3 to cause the master member 19 to move to the position shown in which the lug 106 thereon pivots the latch 100 counter-clockwise to a position in which it releases the ring 41.

When in this position, if a normal exposure is to be made, the trigger 14 is merely manually operated, permitting the master member to actuate the shutter leaves in the usual manner. If it is desired to have the shutter actuating mechanism operate the shutter with the setting lever 16 in the set position shown in Figs. 1 and 3, as is the case when synchronizing flash lamps having a "lag," the arm 52 may be pushed downwardly tensioning the spring 43 which operates the gear train, and placing the parts in the position shown in Figs. 1 and 3. The nose 63 on the lever 57 through engagement with star wheel 50 holds the shutter actuating mechanism in a set position ready for an exposure.

This latch mechanism just described makes the shutter relatively foolproof for the reasons that: the actuating mechanism cannot be set until the shutter is first set, thereby eliminating the chance of an operator setting the actuating mechanism and thinking that he has cocked the shutter; pressure upon the trigger always causes an exposure regardless of what type of exposure is to be made; and the necessary sequence of operations reminds the operator to check the type of exposure which is desired, namely, normal, flash with lamps having no "lag," or flash with lamps having a definite "lag."

The operation of the present invention will now be briefly outlined. If in the first instance it is desired to make an exposure using a flash lamp having a 5 millisecond "lag," the set screw 68 is loosened and the segment 66 is moved until the numeral 5 shows in the window 67 in the shutter cover. The connector 85 of the flash lamp accessory is then connected to the terminal 75 on the shutter. Then the shutter is set by moving the setting lever 16 in a clockwise direction and finally the arm 52 is moved downwardly as far as it will go to cock the shutter actuating means. Now the shutter is ready for an exposure and the parts are in the position shown in Fig. 3. If now the trigger 14 is depressed manually, the trigger lever will move only until the lug 36 drops into the notch 39, see position of parts in Fig. 1. At this instant, the latch 23 has not completely released the master member 19 but the switch lever 57 has been allowed to move clockwise and simultaneously close the lamp switch and release the shutter actuating mechanism, see Fig. 1. Then the actuating ring 41 is driven counter-clockwise by the spring 43 through the gear train and, in a given time in accordance with the "lag" of the lamp being used, the hook 34 thereon in turn engages and cams the lug 36 on the lever 30 from the notch 39, see Fig. 4, positively engages the lug 35 on the lever and pulls it along with it far enough to release the master member 19, see Fig. 5. At the instant the incline 53 has cammed the trigger lever clockwise until the lug 35 snaps off of the hook 34, the lever returns to its normal position, see Fig. 6, the lug 36 riding along the cam on the ring 41 adjoining the hook 34 which covers the notch 39. At this time the switch is again opened and the circuit is ready for a new lamp.

If it is desired to synchronize a lamp having no "lag" the shutter actuating mechanism is left in its normal position. In this position of parts, see Fig. 6, the notch 39 is covered and the exposure is controlled by manual operation of the trigger. The first switch, including contacts 55 and 57, is held open and the lamp circuit is closed when pin 95 reaches the contact 96 or at the instant the shutter blades are wide open.

If it is desired to make a normal exposure without flash lamps with the shutter, the actuating mechanism is left in its normal position and the shutter is under full control of the shutter trigger. It will be appreciated that the switch contacts are so arranged that they in no way interfere with the normal operation of the shutter and have no tendency whatsoever to effect its normal speed characteristics. In fact, the only thing which makes this shutter appear different from an ordinary shutter is the terminal 75 extending from the periphery thereof.

Although I have shown and described certain specific embodiments of my invention, I am fully aware that many modifications thereof are possible. My invention, therefore, is not to be limited to the precise details of construction shown and described, but is intended to cover all modifications coming within the scope of the appended claims.

Having thus described my invention, what I claim as new and desire to secure by Letters Patent of the United States is:

1. In a photographic shutter having an associated flash synchronizing device the combination with a master member; shutter blades; operable connections between the blades and master member; a trigger mechanism for releasably holding said master member in a cocked position; and including a lever constituting a first latch member, a second latch member in the shutter adapted to be positively engaged by said first latch member in the shutter when the trigger mechanism is given an initial movement insufficient to release the master member; an actuating member movable between set and normal positions, normally inoperative driving means, including a retard mechanism, for driving the actuating member from its set to normal position; means on said actuating member for disengaging said lever from engagement with said second latch and then positively engaging said lever to further move the trigger mechanism to release the master member as the actuating member moves from its set to its normal position; means for instigating operation of said driving means at the completion of said initial movement of the trigger mechanism; of a switch in said shutter adapted to be connected into an electric circuit controlling the ignition of a flash lamp; said switch arranged to be closed by a part of said trigger mechanism during the initial movement thereof and in timed relation to the instigation of operation of said driving means for the actuating member in order to cause a delay between the closing of the lamp circuit and the opening of the shutter in accordance with the "lag" of a given flash lamp.

2. A photographic shutter according to claim 1, in which the switch is normally closed and is held open by a part of said trigger mechanism until said mechanism is initially moved.

3. A photographic shutter according to claim 1, in which the switch comprises a stationary contact and a pivoted contact normally spring pressed into engagement with the stationary contact; a tail on said movable contact arranged to be moved to, and held in, a switch opening position by a part of said trigger mechanism until the mechanism is initially moved.

4. A photographic shutter according to claim 1, in which the switch is arranged relative to the trigger mechanism so that it is closed substantially simultaneously with the release of the driving means for said actuating member during the initial movement of the trigger mechanism.

5. A photographic shutter according to claim 1, in which the switch includes a stationary contact; a pivoted contact movable to and from said stationary contact; said pivoted contact so formed and arranged as to constitute a pawl adapted to engage and lock said driving means for the actuating member when moved to a switch opening position and to release said driving mechanism when moved to a switch closing position.

6. A photographic shutter according to claim 1, and including a second switch wired in parallel with said first switch and comprising a contact carried by a part of the shutter blade mechanism to move over a given path in conjunction therewith; a stationary contact disposed in the path of movement of said first contact to be engaged thereby at the instant the shutter blades are in their full open position; and means for selectively preventing the closure of said first switch when said second switch is to be used for synchronizing flash lamps having no "lag."

7. A photographic shutter according to claim 1, and including a second switch wired in parallel with said first switch and comprising a contact carried by a part of the shutter blade mechanism to move over a given path in conjunction therewith; a stationary contact disposed in the path of movement of said first contact to be engaged thereby at the instant the shutter blades are in their full open position; and means on said actuating member for preventing the closure of said first switch when said second switch is to be used for synchronizing lamps having no "lag."

8. A photographic shutter according to claim 1, in which the trigger mechanism actuating member is settable to different positions; in each of which the trigger mechanism engaging part thereof is disposed at varying distances from the part of the trigger mechanism it is to engage to alter the duration of the delay between the time the switch is closed and the shutter is tripped; and means including a suitable scale, associated with said actuating member for facilitating the setting of said actuating member in accordance with the delay between the instant the lamp is ignited and the shutter is tripped required with different types of flash lamps.

9. A photographic shutter according to claim 1, in which the trigger mechanism actuating member is settable to different positions; in each of which the trigger mechanism engaging part thereof is disposed at varying distances from the part of the trigger mechanism it is to engage to alter the duration of the delay between the time the switch is closed and the shutter is tripped; an adjustable stop on said shutter adapted to be engaged by a part of said actuating member to positively determine the set position thereof; said stop carried by a plate slidably mounted on said shutter; said plate and shutter bearing cooperating indices to facilitate setting the adjustable stop in accordance with the known "lag" characteristics of different flash lamps.

CARL C. FUERST.